(12) United States Patent
Thore et al.

(10) Patent No.: US 9,377,549 B2
(45) Date of Patent: Jun. 28, 2016

(54) METHOD FOR ESTIMATING ELASTIC PARAMETERS BY INVERTING 4D SEISMIC MEASUREMENTS

(75) Inventors: Pierre Thore, Pau (FR); Christian Hubans, Pau (FR)

(73) Assignee: Total SA, Courbevoie (FR)

( * ) Notice: Subject to any disclaimer, the term of this patent is extended or adjusted under 35 U.S.C. 154(b) by 244 days.

(21) Appl. No.: 13/825,287

(22) PCT Filed: Sep. 16, 2011

(86) PCT No.: PCT/FR2011/052136
§ 371 (c)(1),
(2), (4) Date: Mar. 20, 2013

(87) PCT Pub. No.: WO2012/038647
PCT Pub. Date: Mar. 29, 2012

(65) Prior Publication Data
US 2013/0176822 A1     Jul. 11, 2013

(30) Foreign Application Priority Data
Sep. 20, 2010   (FR) ...................................... 10 57508

(51) Int. Cl.
*G01V 1/30* (2006.01)
(52) U.S. Cl.
CPC ................ *G01V 1/306* (2013.01); *G01V 1/308* (2013.01)
(58) Field of Classification Search
CPC ............................... G01V 1/306; G01V 1/308
USPC .......................................................... 367/73
See application file for complete search history.

(56) References Cited

U.S. PATENT DOCUMENTS 5,798,982 A     8/1998  He et al.
7,764,840 B2 *  7/2010  Gendron et al. ............... 382/225

FOREIGN PATENT DOCUMENTS

EP         1 865 340 A1   12/2007
WO   WO 2008/140655 A1   11/2008

OTHER PUBLICATIONS

Grandi A., Wauquier S., Cumming H., Deplante C., Hubans C.: "Quantitative 4D Warping Inversion", SPE, Society of Peteroleum Engineers, (Dec. 7, 2009),-(Dec. 9, 2009), pp. 1-8, XP002635086, Doha, Q. pp. 2, 3, p. 7.
Marvillet C., Hubans C., Thore P., Desegaulx P., Al-Mehairi Y.S., Shuaib M., Al Shaikh: "Seismic monitoring feasibility on Bu-Hasa field", SPE Society of Petroleum Engineers, (Dec. 4, 2007),-(Dec. 6, 2007), pp. 1-8, XP002635087, Dubai U.A.E. pp. 6,7.

* cited by examiner

*Primary Examiner* — Daniel L Murphy
(74) *Attorney, Agent, or Firm* — Patterson Thuente Pedersen, P.A.

(57) ABSTRACT

According to the invention, elastic parameters, including density, pressure wave propagation speed, and/or shear in pervious layers located in a dense underground area along an array of horizontal positions, are estimated by inverting 4D seismic data. Firstly, an estimate of variations in the elastic parameters in one or more starting positions of the array, which can be located on bored wells within the area in question, is obtained. Then, a propagation algorithm is used in order to gradually carry out the 4D data inversion on the basis of the starting positions. The inversion takes into account the previously estimated parameter variations. A spatial variation in the depth and/or the thickness of the pervious layers in question can also be taken into account. Propagation is based on positions that are consecutively selected as providing optimal values for a cost function assessed in order to invert the 4D data.

24 Claims, 8 Drawing Sheets

METHOD FOR ESTIMATING ELASTIC PARAMETERS BY INVERTING 4D SEISMIC MEASUREMENTS

PRIORITY CLAIM

The present application is a National Phase entry of PCT Application No. PCT/FR2011/052136, filed Sep. 16, 2011, which claims priority from FR Application No. 10 57508, filed Sep. 20, 2010, the disclosures of which are hereby incorporated by reference herein in their entirety.

The present invention relates to the geophysical methods employed to estimate parameters of the subsoil, notably in the context of hydrocarbon exploration and production.

BACKGROUND OF THE INVENTION

It relates more particularly to the so-called 4D seismic techniques. In these techniques, there are first seismic recordings, obtained in a first phase during a campaign of "base" measurements ("base survey"), for example before a hydrocarbon reservoir is placed in production, and there is a subsequent campaign of measurements ("monitor survey"), for example after a few years of operation of the reservoir, to obtain second seismic recordings. The base and monitor seismic recordings (or seismic traces) are compared to estimate variations of physical parameters of the geological layers in the area explored.

The parameters of which the variations are thus estimated may comprise the density $\rho$, the speed $V_P$ of propagation of the pressure waves (P waves) and the speed $V_S$ of propagation of the shear waves (S waves) in the media forming the various geological layers of the area explored. Reference is often made to the seismic impedances in each medium, $I_P = \rho \times V_P$ and $I_S = \rho \times V_S$, which govern the propagation of the P waves and S waves in the layers. Because of the changes linked to oil production, for example the replacement of oil with water or gas, the parameters $\rho$, $V_P$, $V_S$ are modified in certain layers. This results in changes of amplitude in the seismic recordings, and in time offsets in the recorded seismic traces. The comparative analysis of the recordings comprises an inversion to estimate the variations of the parameters in order to obtain an idea of the levels of saturation in the layers being operated.

An inversion method that can be used to analyze the time offsets in the base and monitor seismic traces (dependent on the variations of propagation speeds) at the same time as the changes of amplitude (dependent on the impedance variations) is described in EP 1 865 340 A1.

A 3D seismic technique, i.e. a technique based on a single survey, taking into account well logs is described in the U.S. Pat. No. 5,798,982, which also mentions an extension of the technique to 4D seismic by a comparison of inverted seismic blocks.

Another 4D seismic data analysis method, described in WO 2008/140655 A1, uses a model-based inversion in one or more wells where logs have been recorded. The document does not describe the inversion method or the way in which the model is parameterized. The results of the inversion are then extended by moving away from the well, using a statistical method. A correlation computation is performed in order to relate the time reference of the monitor recordings to that of the base recordings. With the model used, the method seeks to directly estimate variations of saturation levels and pressure variations in the geological layers.

An object of the invention is to add to the 4D seismic techniques, notably by making them take into account geological and dynamic constraints.

SUMMARY OF THE INVENTION

There is proposed a method for estimating elastic parameters of a region of the subsoil according to a network of horizontal positions, comprising:
 (a) measuring, in a first phase, base seismic traces associated with said horizontal positions;
 (b) measuring, in a second phase, monitor seismic traces associated with said horizontal positions and corresponding to the base seismic traces;
 (c) obtaining an estimation of the variations of elastic parameters between the first and the second phases in permeable layers of the subsoil in at least one starting position of the network, the elastic parameters including the density and the speed of propagation of the pressure waves in each of said permeable layers;
 (d) determining a boundary consisting of the positions of the network which are adjacent to a starting position;
 (e) estimating, at each position of the boundary, the variations of the elastic parameters in the permeable layers and/or the depths and/or thicknesses of said permeable layers by minimizing a cost function derived from a seismic wave propagation model accounting for the evolution between the base and monitor seismic traces associated with said position of the boundary, the minimization taking into account the variations estimated at the adjacent starting position, and marking each position of the boundary as having been processed;
 (f) removing from the boundary any position where the minimized cost function exceeds a limit value;
 (g) selecting at least one propagation position in the boundary, where the minimized cost function has, within the boundary, a minimal value, then removing the selected propagation position from the boundary;
 (h) adding to the boundary each position of the network not marked as processed and adjacent to a propagation position selected in the preceding step (g);
 (i) estimating, at each position added to the boundary in the preceding step (h), the variations of the elastic parameters in the permeable layers and/or the depths and/or thicknesses of said permeable layers by minimizing the cost function derived from the seismic wave propagation model accounting for the evolution between the base and monitor seismic traces associated with said position added to the boundary, the minimization taking into account the variations estimated at the selected propagation position, and marking each position added to the boundary in the preceding step (h) as having been processed;
 (j) removing from the boundary any position added in the preceding step (h) where the minimized cost function exceeds the limit value; and
 (k) repeating from step (g) if the boundary still contains at least one position adjacent to a position of the network not marked as processed.

The technique uses a geological-dynamic a priori to estimate the 4D parameters on the reservoir scale. This estimation is performed along a predefined direction, generally vertical. At the starting positions, it can be the direction of a well drilled in the area studied or, in certain situations, a direction chosen arbitrarily without having to be located on a well. Starting from one or more starting positions of this type, the 4D inversion process is propagated step by step by implicitly assuming that there is a relative continuity of the estimated parameters between the adjacent positions of the network. In each iteration, the "best" position of the boundary is selected to continue the propagation and the inversion at the new adjacent positions is performed by taking into account the values found for this "best" position. If the inversion by minimization of the cost function yields a mediocre result, the propagation is stopped, which probably reflects a loss of continuity of the parameters.

It is possible, in each iteration, to select for the propagation a number of positions of the network considered as best in terms of the minimized cost function. This makes it possible to speed up the processing operations, notably when a plurality of computers are implemented in parallel to produce the 4D inversions.

When the speeds of propagation that are being estimated are limited to the speed of propagation of the pressure waves $V_P$, the base and monitor seismic traces can be measured by sending seismic waves at normal incidence toward the underlying layers and by collecting the seismic waves reflected by interfaces between said layers. The method can also be extended to the estimation of the speeds of propagation of the shear waves in the permeable layers, the base and monitor seismic traces then being measured by sending seismic waves at non-normal incidence toward the underlying layers and by collecting the seismic waves reflected by the interfaces between said layers. The elastic parameters whose variations are being tested can also include the position, along said direction, of at least one interface delimiting one of said permeable layers.

In one embodiment of the method, a number of assumptions as to the variation of the elastic parameters in the permeable layers and/or of depths and/or of thicknesses of these permeable layers are defined at a position of the boundary based on the variations estimated at the starting or propagation position adjacent to this position of the boundary. The minimization of the cost function in step (e) or (i) of estimation, at this position of the boundary, of the variations of the elastic parameters in the permeable layers and/or of the depths and/or of the thicknesses of said permeable layers may then comprise, for each of the assumptions:

estimating a perturbation in amplitude of the measured base seismic trace associated with said position of the boundary following the variation of the elastic parameters and the changes of depths and/or of thicknesses conforming to said assumption;

computing a seismic pseudo-trace by combining one of the measured seismic traces associated with the position of the boundary with the estimated amplitude perturbation; and comparing, on a same timescale, the other measured seismic trace associated with the position of the boundary with the computed seismic pseudo-trace in order to evaluate the cost function.

The variation of the elastic parameters and/or the depths and/or the thicknesses of the permeable layers can then be estimated in accordance with an assumption for which the evaluated cost function is minimal In particular, the perturbation in amplitude can be estimated as a function of impedance variations in the permeable layers, deduced from the assumption of variation of the elastic parameters, and from a wavelet representative of an incident seismic signal.

When the measured seismic trace combined with the estimated amplitude perturbation for the computation of the seismic pseudo-trace is typically the measured monitor seismic trace, the combination may comprise:

modifying a timescale of the measured monitor seismic trace to take into account the variation in speed of propagation of the seismic waves according to the assumption of variation of elastic parameters; and subtracting the estimated amplitude perturbation from the modified measured monitor seismic trace.

At the starting positions of the network, the elastic parameter variations are typically taken into account in permeable layers along a well drilled in the subsoil. The permeable layers may be positioned along the direction of drilling of the well, based on measurements (logs) performed in the well. Another possibility, if the well is in operation, is to define the positions of the permeable layers along the well based on positions of perforations produced in a casing of the well.

For a well that is in operation, there is usually a reservoir grid used by the reservoir engineers to predict production. A reservoir grid is constructed by a geomodeling technique based on structural information derived from the seismic recordings and from the wells. This grid is filled with the physical properties of the rocks, notably the permeability and the porosity, calibrated on the well data. Typically, a certain number of wells are drilled in the area placed in operation, and the data obtained from the logs are interpolated between wells to establish a first grid which is then refined using the seismic recordings. In the context of the present invention, the reservoir grid can be used to provide the geological a priori used in the 4D inversion. This geological a priori is supplied in proximity to the well but also by moving away therefrom to facilitate the process of propagation of the inversion method. Moreover, the depth and/or thickness values of the permeable layers, which are determined by the propagation of the inversion of the 4D data in certain embodiments of the method, make it possible to refine the geometry of the reservoir grid.

Step (c) of obtaining an estimation of the variations of elastic parameters between the first and the second phases in permeable layers of the subsoil at a starting position given by the position of a well may comprise:

making assumptions as to the variation of the elastic parameters in permeable layers of predefined positions along the well between the first and the second phases;

numerically evaluating a capacity of each assumption as to the variation of elastic parameters to account for an evolution between the measured base and monitor seismic traces associated with said starting position;

estimating the variation of the elastic parameters in accordance with an assumption having an optimum evaluated capacity.

One way of numerically evaluating the capacity of an assumption as to the variation of elastic parameters to account for the evolution between the measured base and monitor seismic traces associated with the starting position given by the position of a well consists in:

computing a simulated base seismic trace on the basis of a wavelet representative of an incident seismic signal and of values of the elastic parameters measured in the well in the first phase;

obtaining values of the elastic parameters in the well for the second phase on the basis of the values measured in the well in the first phase and of the assumption of variation;

computing a simulated monitor seismic trace on the basis of the wavelet and of the values of the elastic parameters in the well obtained for the second phase; and comparing the difference between the measured base and monitor seismic traces associated with the starting position with the difference between the simulated measured base and monitor seismic traces.

Another way of evaluating this capacity consists in:
obtaining values of the elastic parameters in the well for the second phase on the basis of values of the elastic parameters measured in the well in the first phase and of the assumption of variation;
estimating a perturbation in amplitude of the measured base seismic trace resulting from a change of the elastic parameters in the well from the values measured in the first phase to the values obtained for the second phase;
computing a seismic pseudo-trace by combining one of the measured seismic traces associated with the starting position with the estimated amplitude perturbation; and
comparing, on a same timescale, the other measured seismic trace associated with the starting position with the computed seismic pseudo-trace.

To estimate the perturbation in amplitude, one possibility involves:
computing a simulated base seismic trace on the basis of a wavelet representative of an incident seismic signal and of the values of the elastic parameters measured in the well in the first phase;
computing a simulated monitor seismic trace on the basis of said wavelet and of the values of the elastic parameters in the well obtained for the second phase, the simulated base and monitor seismic traces being computed with a same depth-time conversion law; and
subtracting the simulated base seismic trace from the simulated monitor seismic trace to obtain the estimated amplitude perturbation.

BRIEF DESCRIPTION OF THE DRAWINGS

Other features and advantages of the present invention will become apparent in the following description of a nonlimiting exemplary embodiment, with reference to the appended drawings, in which.

DESCRIPTION OF EMBODIMENTS

Figure 1:
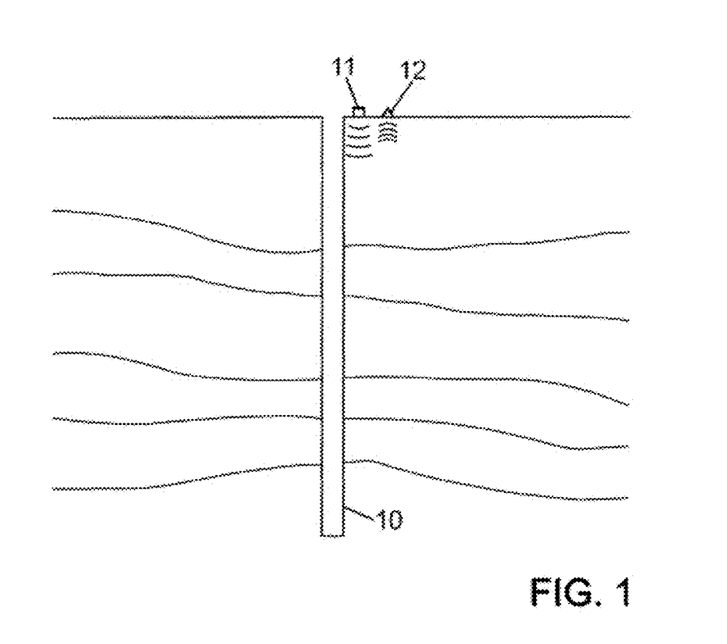
FIG. 1 is a diagram illustrating a seismic measurement mode near a well.

FIG. 1 illustrates an oil production area where a well 10 has been drilled. This well 10 passes through layers, represented very diagrammatically in FIG. 1, that have variable elastic parameters.

Figure 2:
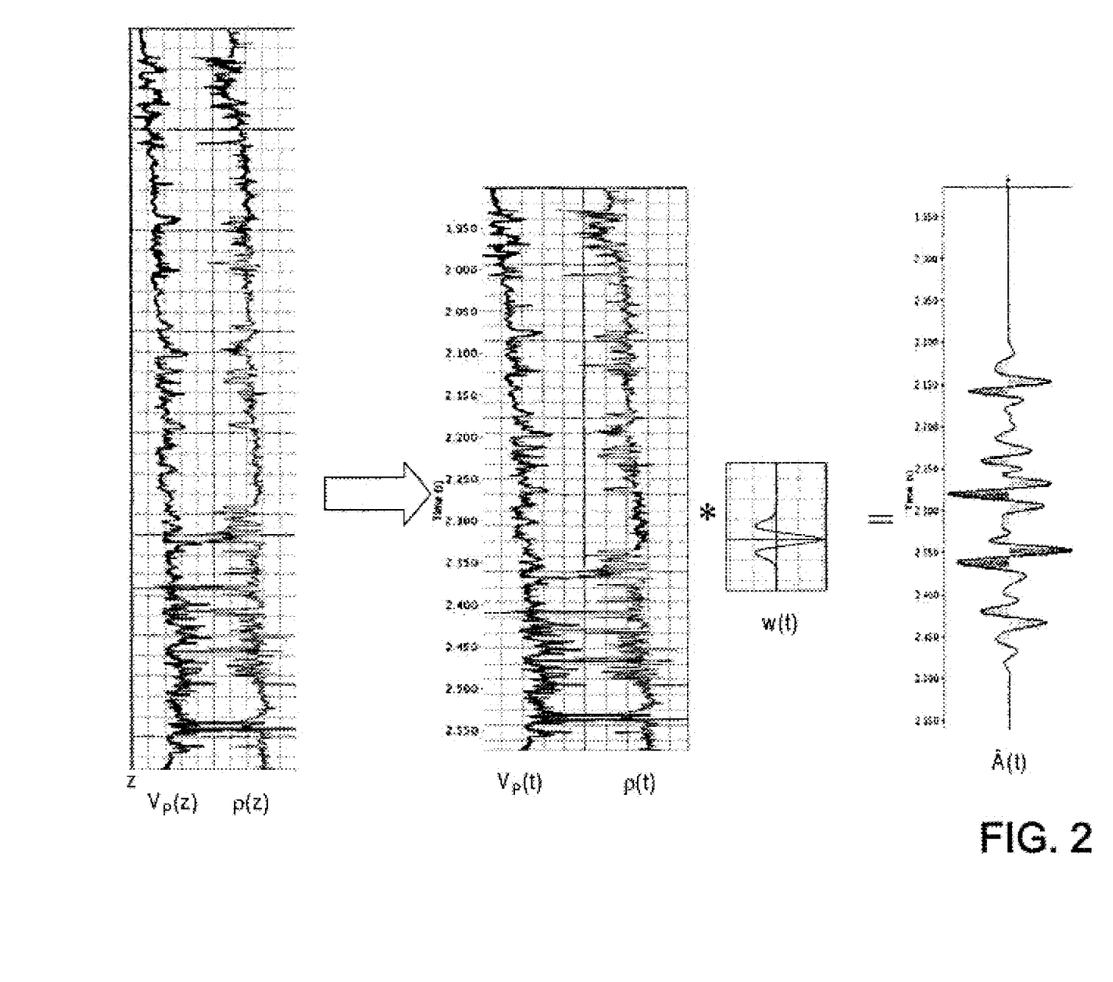
FIG. 2 is a diagram illustrating synthesis of a seismic trace on the basis of measurements performed in a well (logs)

Before the casing of the well is put in place, a number of measurements (logs) have been carried out therein in order to know, with a resolution of the order of a few tens of centimeters, the values of different physical parameters of the rocks passed through by the well. These parameters notably include the porosity, the permeability, the density and the speed of propagation of the pressure waves. The left hand part of FIG. 2 shows an exemplary recording of the speed $V_P$ of propagation of the pressure waves and of the density ρ of the rocky formations as a function of depth along the well.

In a seismic survey in the region considered, a source of seismic waves 11 is successively placed at different places on the surface, or in the sea in the case of an offshore area, and one or more seismic wave detectors 12 collect the seismic waves originating from the source 11 which are reflected on the interfaces between the geological layers encountered. FIG. 1 illustrates the particular case in which the source 11 and the detector 12 are placed in immediate proximity to the well 10 in order to record seismic waves which are propagated vertically along the well with an approximately normal incidence on the interfaces between layers.

In this configuration, the amplitude of the seismic signal collected by the detector 12 can be modeled by a convolution of the seismic impedance $I_P = \rho \times V_P$ relative to the pressure waves with a wavelet w(t) representing the wave form of the signal emitted by the source 11:

$$\hat{A}(t) = \sum_\tau \rho(\tau) \cdot V_P(\tau) \cdot w(t-\tau) = I_P(t) * w(t) \quad (1)$$

This modeling is illustrated by FIG. 2 where the first step consists in converting the logs $V_P(z)$, $\rho(z)$ obtained as a function of the depth in the well into logs $V_P(t)$, $\rho(t)$ expressed as a function of the propagation time of the waves to be able to be convolved according to (1). The depth-time conversion law used for that is directly deduced from the evolution of the speed $V_P$ along the well. The convolution of the impedance $I_P = \rho \times V_P$ by the wavelet W(t) makes it possible to synthesize a seismic trace $\hat{A}(t)$ represented in the right hand part of FIG. 2.

In general, it is possible to obtain the profile of the parameters $V_P$ and ρ along the well using the logs initially performed, i.e. performed in the base time. However, in the 4D seismic monitor time (typically a few years after the base time), there is no longer access to the wall of the well to be able to measure therein the values of $V_P$ and ρ which might have changed because of the production.

However, assumptions can be formulated as to the variations $\Delta V_P$ and $\Delta \rho$ of the parameters between the base time and the monitor time and the capacity of these assumptions of variation to account for the modifications of the seismic traces recorded in conditions similar to the base time and to the monitor time can be tested. It is convenient to express these parameter variations in a relative manner, namely in the form $\Delta V_P/V_P$ and $\Delta \rho/\rho$.

Figure 3:
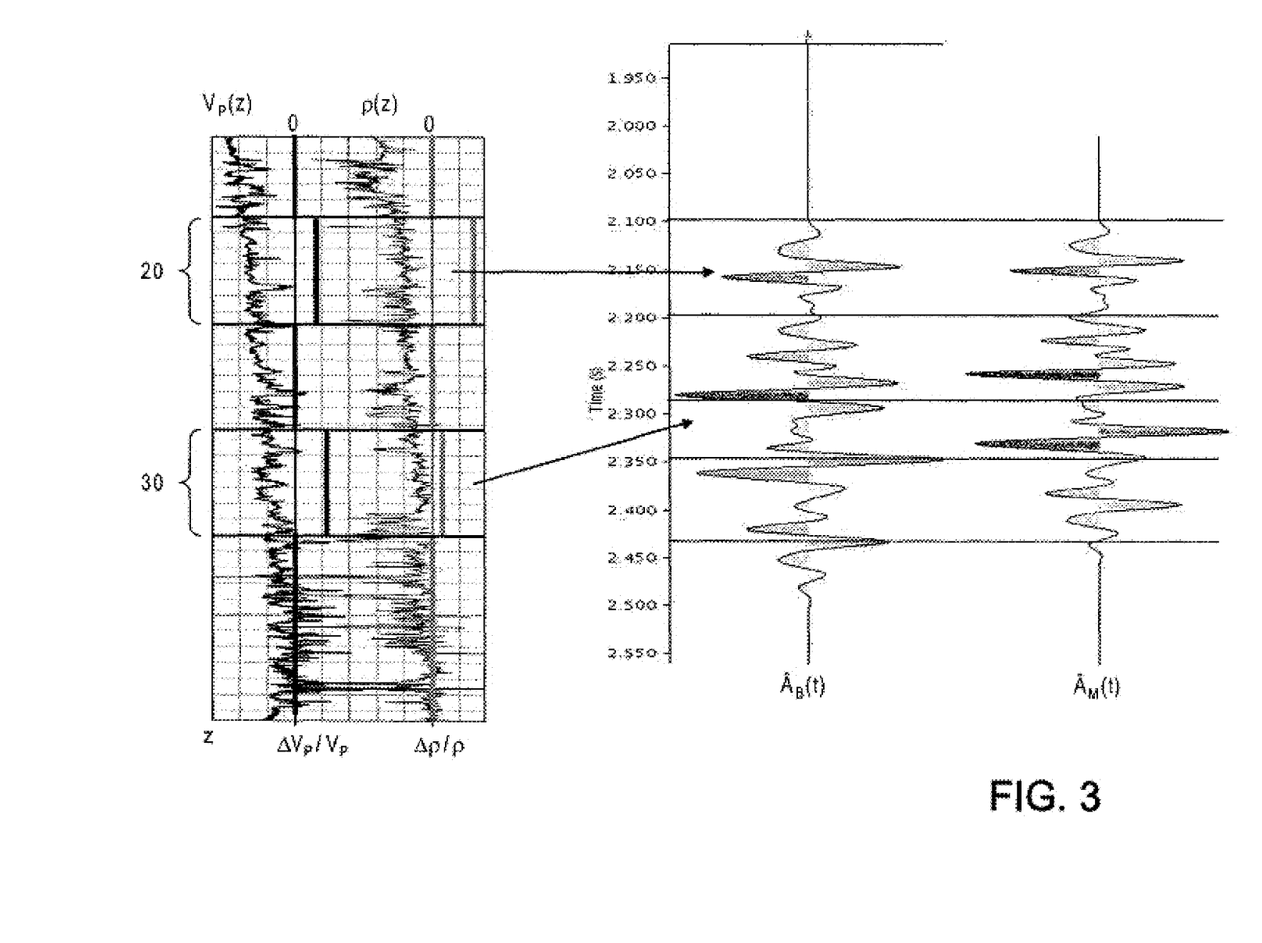
FIG. 3 is a diagram illustrating the evolution from a base seismic trace to a monitor seismic trace as a function of an assumption of variation of the density and of the speed of propagation of the pressure waves in the permeable layers along the well.

In general, it is in the permeable layers encountered along the well that the parameters $V_P$ and ρ will have changed most significantly because it is in these layers that the oil extracted from the subsoil flows during operation. In the left hand part of FIG. 3, two permeable layers 20, 30 are represented in which the speed $V_P$ and the density ρ have been able to change between the base time and the monitor time, an assumption of variation $\Delta V_P/V_P$ and $\Delta \rho/\rho$ being indicated in these layers (in practice, the number of these layers is much greater than 2). It is then possible to synthesize a simulated base seismic trace $\hat{A}_B(t)$ and a simulated monitor seismic trace $\hat{A}_M(t)$:

$$\hat{A}_B(t) = \sum_\tau \rho(\tau) \cdot V_P(\tau) \cdot w(t-\tau) \quad (2)$$

$$\hat{A}_M(t) = \sum_\tau [\rho(\tau) + \Delta\rho(\tau)] \cdot [V_P(\tau) + \Delta V_P(\tau)] \cdot w(t-\tau) \quad (3)$$

$$= \sum_\tau \rho(\tau) \cdot V_P(\tau) \cdot \left[1 + \frac{\Delta\rho}{\rho}(\tau)\right] \cdot \left[1 + \frac{\Delta V_P}{V_P}(\tau)\right] \cdot w(t-\tau)$$

The change in the density $\rho$ and the speed $V_P$ as a result of the oil production has two effects on the modeling:
- a change in the depth-time relationship used for the conversion of the logs $\rho(z) \to \rho(t)$ and $V_P(z) \to V_P(t)$;
- a change of amplitude due to the change of impedance as indicate by the above formula (3).

From these expressions (2) and (3), it is possible to check whether the assumption of variation $\Delta V_P/V_P$ and $\Delta\rho/\rho$ properly accounts for the evolution observed between two seismic traces $A_B(t)$, $A_M(t)$ successively measured at the base time and at the monitor time.

Figure 4:
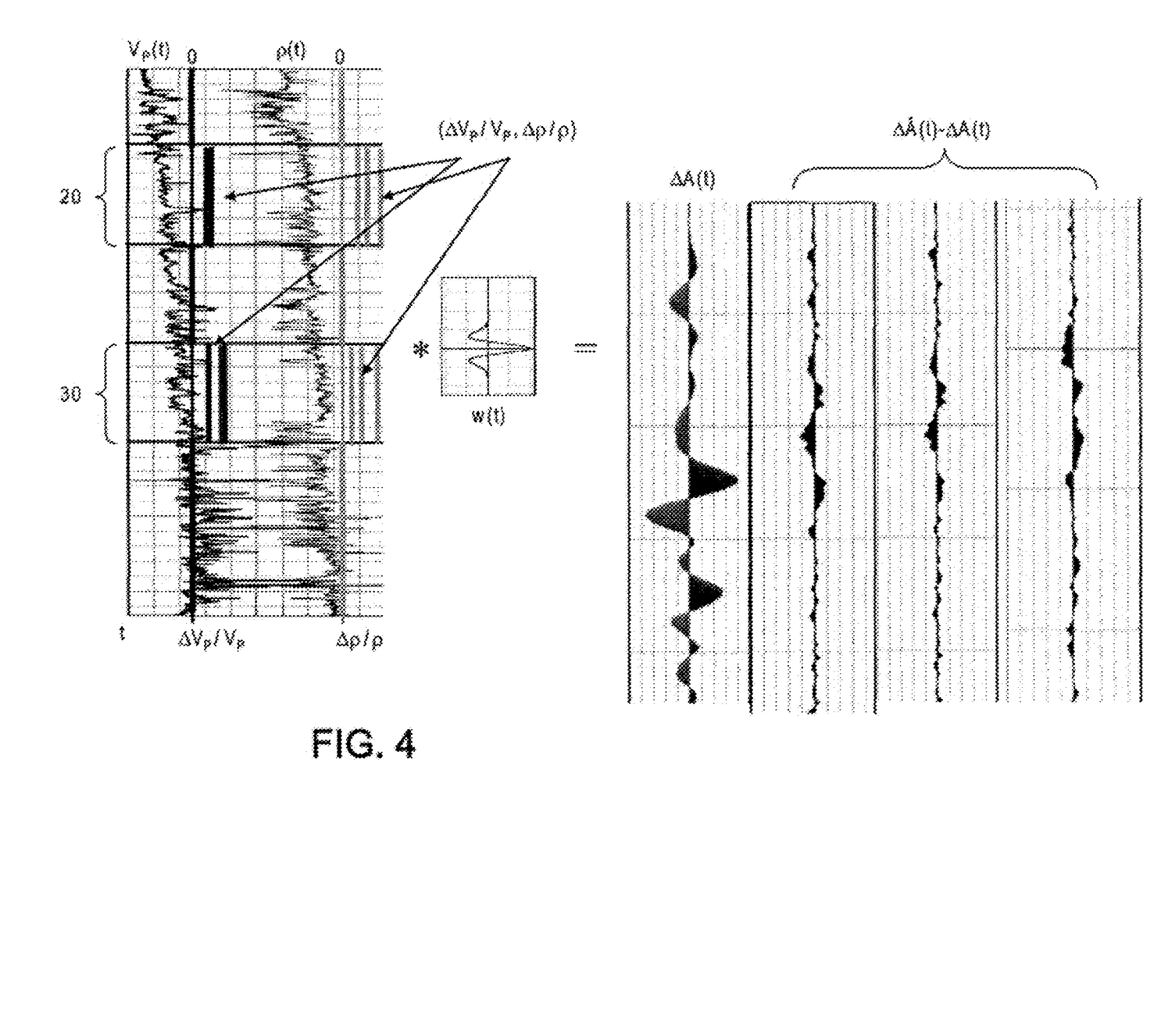
FIG. 4 is a diagram illustrating a first embodiment of the method for estimating elastic parameters according to the invention.

FIG. 4 illustrates a first way of carrying out this check. The left hand part of FIG. 4 shows the logs $V_P(t)$ and $\rho(t)$ measured as a function of the depth at the base time and converted to be expressed as a function of the propagation time, as well as a number of assumptions $\Delta V_P/V_P$, $\Delta\rho/\rho$ of variation of the parameters in the permeable layers 20, 30.

Using the scheme illustrated by FIG. 3, base and monitor simulated seismic traces $\hat{A}_B(t)$, $\hat{A}_M(t)$ are obtained, then their difference $\Delta\hat{A}(t) = \hat{A}_M(t) - \hat{A}_B(t)$ is computed. This difference $\Delta\hat{A}(t)$ is compared to the difference $\Delta A(t) = \Delta A_M(t) - \hat{A}_B(t)$ between the measured base and monitor traces. The difference $\Delta\hat{A}(t) - \Delta A(t)$ is minimized as a function of the assumptions of variation $\Delta V_P/V_P$, $\Delta\rho/\rho$ in order to select the assumption which accounts best for the evolution in the seismic trace. The optimization may consist in scanning a large number of assumptions $\Delta V_P/V_P$, $\Delta\rho/\rho$ and in retaining the one that provides the smallest average value of $|\Delta\hat{A}(t) - \Delta A(t)|$ or $[\Delta\hat{A}(t) - \Delta A(t)]^2$, or which minimizes another distance measurement between $\Delta\hat{A}(t)$ and $\Delta A(t)$. Another possibility is to select an assumption $\Delta V_P/V_P$, $\Delta\rho/\rho$ when the time average of $|\Delta\hat{A}(t) - \Delta A(t)|$ is below a predefined threshold.

Various minimization algorithms can be applied, for example genetic or simulated annealing algorithms, which do not require any computation of gradients and are not trapped in local minima.

The cost function $|\Delta\hat{A} - \Delta A|$ is not necessarily the best for performing the optimization in as much as the synthetic base trace often has an appearance that is quite different from the measured base trace. In practice, it is often more appropriate to transform one of the measured traces into the reference frame of the other trace for each assumption of variation before proceeding with a distance computation between these two traces.

Figure 5:
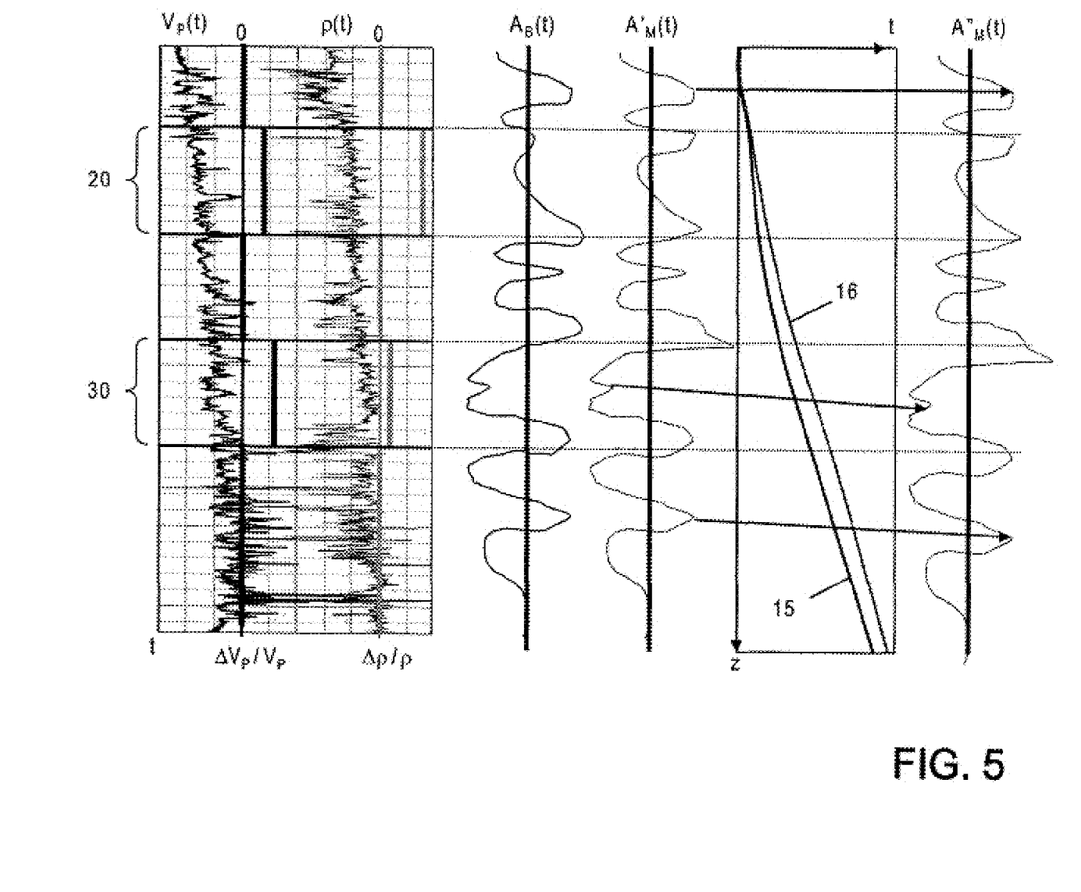
FIGS. 5 and 6 are diagrams illustrating two other embodiments of the method.

Such an embodiment is illustrated by FIG. 5, which shows, in the left hand part, logs $V_P(t)$, $\rho(t)$ as a function of time and an assumption $\Delta V_P/V_P$, $\Delta\rho/\rho$ of variation of the parameters in the permeable layers 20, 30. FIG. 5 also shows a base seismic trace $A_B(t)$ measured before the well is put into production.

From the logs $V_P(z)$ and $\rho(z)$ and the assumptions of variation $\Delta V_P/V_P$, $\Delta\rho/\rho$, a base synthetic trace $\hat{A}_B(t)$ and a base monitor synthetic trace $\hat{A}_M(t)$ are computed by applying the formulae (2) and (3) above. However, before applying the formula (3), the depth-time conversion law applicable to the base time (curve 15 in the z, t diagram of FIG. 5) is used to convert the values $$V_P(z) \cdot \left[1 + \frac{\Delta V_P}{V_P}(z)\right], \rho(z) \cdot \left[1 + \frac{\Delta\rho}{\rho}(z)\right]$$

expressed as a function of depth into values $$V_P(t) \cdot \left[1 + \frac{\Delta V_P}{V_P}(t)\right], \rho(t) \cdot \left[1 + \frac{\Delta\rho}{\rho}(t)\right]$$

expressed as a function of the propagation time. The difference $\Delta\hat{A}(t) = \hat{A}_M(t) - \hat{A}_B(t)$ between the two synthetic traces is then computed in the time reference frame of the base. This difference $\Delta\hat{A}(t)$ is then added to the measured base seismic trace $A_B(t)$ to obtain a first monitor pseudo-trace $A'_M(t)$ represented in FIG. 5: $A'_M(t) = A_B(t) + \Delta\hat{A}(t)$.

This pseudo-trace $A'_M(t)$ is expressed in the time reference frame of the base time. The timescale must be modified to relate the pseudo-trace to the time reference frame of the monitor time and thus obtain a second pseudo-trace $A''_M(t)$ represented in the right hand part of FIG. 5. The change of timescale is performed in such a way as to compensate for the difference between the depth-time conversion law applicable to the base time (curve 15) and the depth-time conversion law applicable to the monitor time (curve 16).

In the embodiment of FIG. 5, the optimization uses a cost function given by the difference between the measured monitor seismic trace $A_M(t)$ and the seismic pseudo-trace $A''_M(t)$ computed in the manner described previously, for example the sum of the squares or the sum of the absolute values of this difference.

It should be observed that there are a number of ways of relating one of the traces to the reference frame of the other by taking into account an assumption of variation of the parameters in order to perform the optimization. An advantageous embodiment starts from the measured monitor seismic trace to relate it to the reference frame of the base seismic trace. In particular, it is possible to begin by modifying the timescale of the measured monitor seismic trace $A_M(t)$ to relate it to the scale applicable to the base time (compensation of the difference between the curves 15 and 16). Then, the difference $\Delta\hat{A}(t)$ computed as previously is subtracted from the pseudo-trace obtained to obtain a pseudo-trace $A''_B(t)$ expressed in the time reference frame associated with the base time. The cost function involved in the optimization is then given by the difference between this pseudo-trace $A''_B(t)$ and the measured base seismic trace $A_B(t)$.

Figure 6:
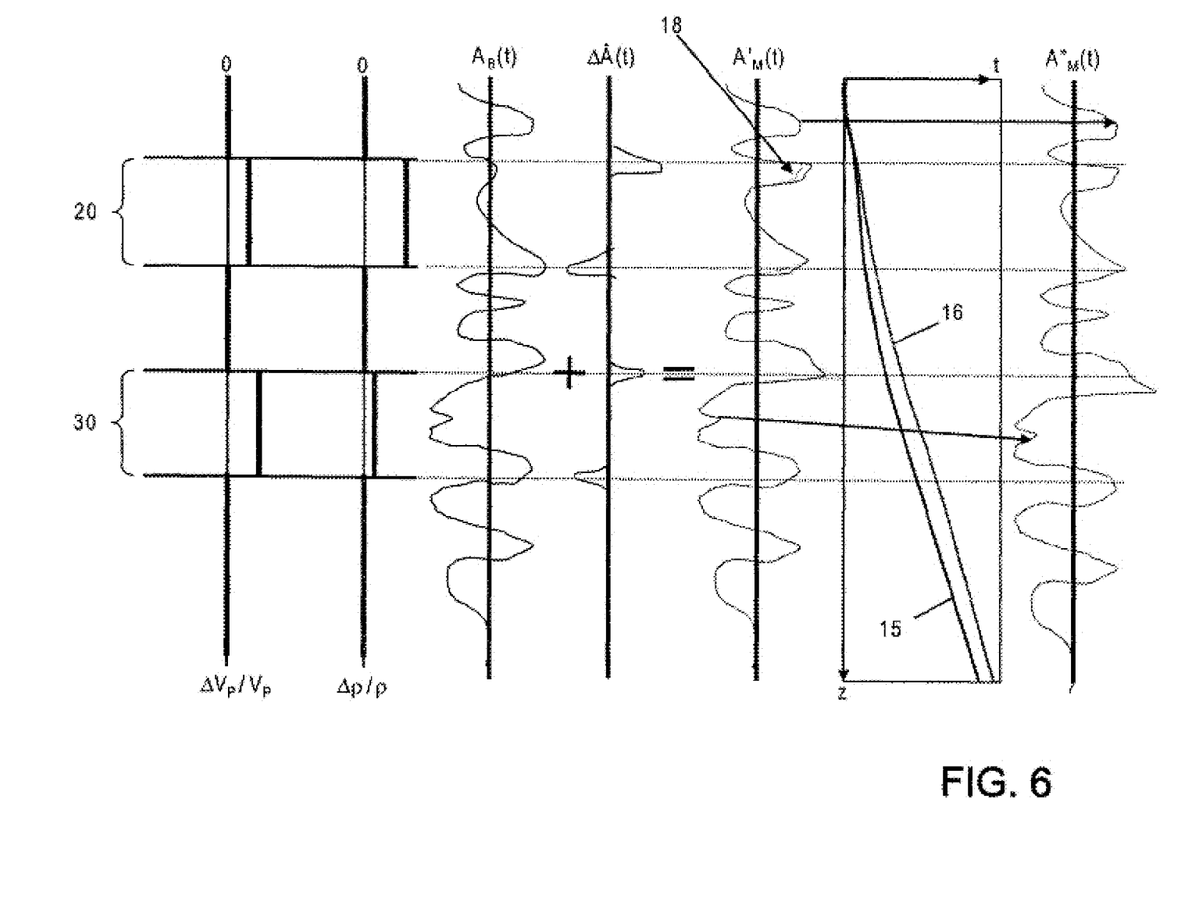

FIG. 6 illustrates an alternative embodiment implementing an approximate method inspired by that of FIG. 5. In this approximate method, no measured log is taken into consideration. Consequently, this method can be applied independently of a well. It is notably applicable for searching for the evolution of the parameters $V_P$, $\rho$ in geological layers whose positioning along a typically vertical direction is determined as a function of the reservoir grid determined for the operation of the area considered.

In the method illustrated by FIG. 6, the modification $\Delta\hat{A}(t)$ of the base seismic trace expressed in the reference frame of the base time is not computed on the basis of measured logs using the above formulae (2) and (3). It is expressed directly as a function of the impedance variation $\ne I_P/I_P$ corresponding to the assumption of variation of the propagation speed $V_P$ and of the density $\rho$:

$$\Delta I_P/I_P \approx \Delta V_P/V_P + \Delta\rho/\rho \qquad (4)$$

The relative variation of amplitude $\Delta\hat{A}/A$ is estimated in an approximate manner as being proportional to the relative impedance variation $\Delta I_P/I_P$, the proportionality coefficient being the amplitude of the wavelet w(t) representing the incident seismic signal.

Based on the perturbation $\Delta\hat{A}(t)$ computed in an approximate manner, the method illustrated by FIG. 6 continues by computing a first monitor pseudo-trace $A'_M(t)=A_B(t)+\Delta\hat{A}(t)$. As in the method illustrated by FIG. 5, a second pseudo-trace $A''_M(t)$ is computed by a change of timescale to be compared to the measured monitor seismic trace $A_M(t)$. The result of the comparison is then used as cost function for the optimization.

In FIG. 6, the trace 18 represented by dotted lines corresponds to the first pseudo-trace $A'_M(t)$ computed without approximation in the manner described with reference to FIG. 5. It can be seen that the approximate pseudo-trace differs slightly from the latter around the edges of the permeable layers.

In the case where the seismic waves are sent at normal incidence toward the layers studied and are collected with no significant lateral offset between the source 11 and the detector 12, the speed of propagation of the pressure waves $V_P$ and the density $\rho$ are sufficient to model the propagation of the waves sensed by the detector 12.

Figure 7:
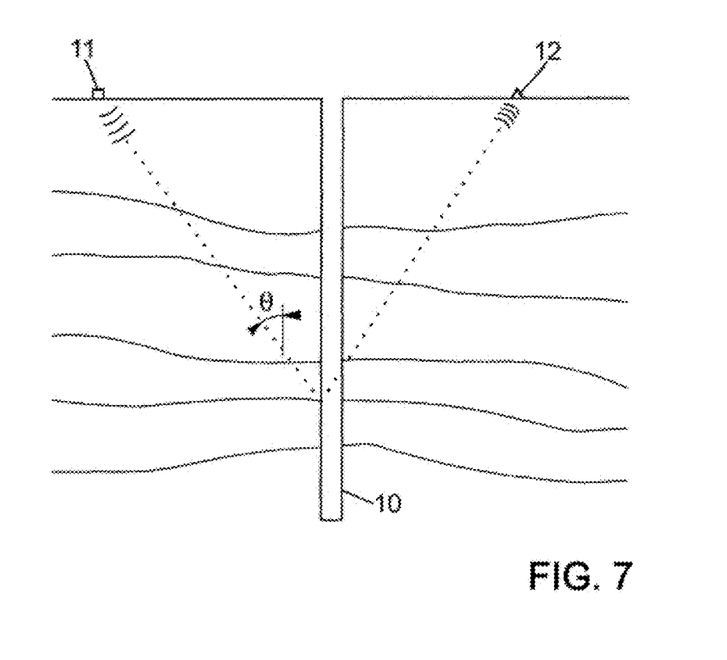
FIG. 7 is a diagram illustrating another way of acquiring a seismic trace that can be used in an embodiment of the method.

The method described above is also applicable in the case where an offset exists between the source 11 and the detector 12 as represented in FIG. 7.

In this latter case, the impedance variation $\Delta I_P/I_P$ involved in the approximate method illustrated by FIG. 6 depends also on the speed of propagation of the shear waves $V_S$ through the angle $\theta$ of incidence of the wave on the interface:

$$\Delta I_P/I_P = \Delta\rho/\rho + [\Delta V_P/V_P]/\cos^2\theta - (2V_S/V_P)^2.[2\Delta V_S/V_S + \Delta\rho/\rho].\sin^2\theta \qquad (5)$$

It can then be seen that it is possible to include the speed $V_S$ of propagation of the shear waves in the elastic parameters taken into account in the assumptions of variation. The method therefore gives access to estimations of the speed $V_S$. One possibility is to evaluate $V_P$ and $\rho$ in a first step on the basis of seismic traces recorded at normal incidence (FIG. 1), and to then make assumptions of variation of the parameters $V_S$ alone to perform the optimization as a function of this parameter in a second step on the basis of seismic traces recorded with offset.

The method described above in different embodiments takes advantage of geophysical information (the seismic traces) and of information commonly available to the reservoir engineers (the layer modeling of the subsoil). It provides a novel way of analyzing 4D seismic data that makes it possible to take into account a priori information as to the geological and dynamic behavior of the area studied.

Figure 8A:
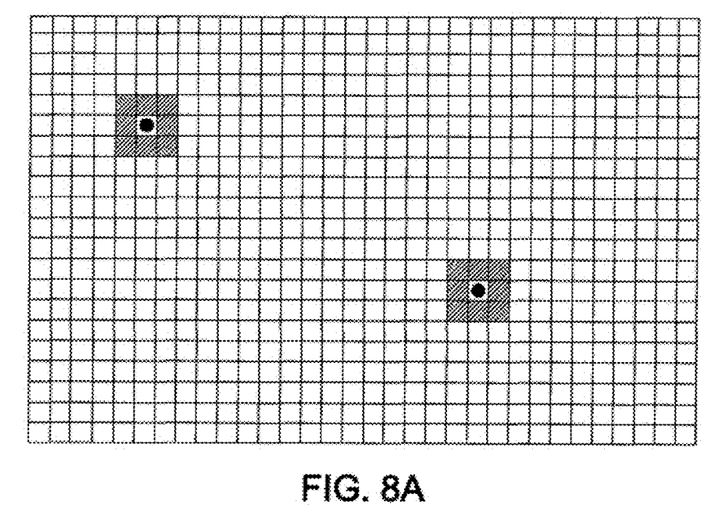
FIGS. 8A and 8B are diagrams of an exemplary mesh of a studied area of the subsoil, illustrating an embodiment of the method according to the invention at two stages of progress.
Figure 8B:
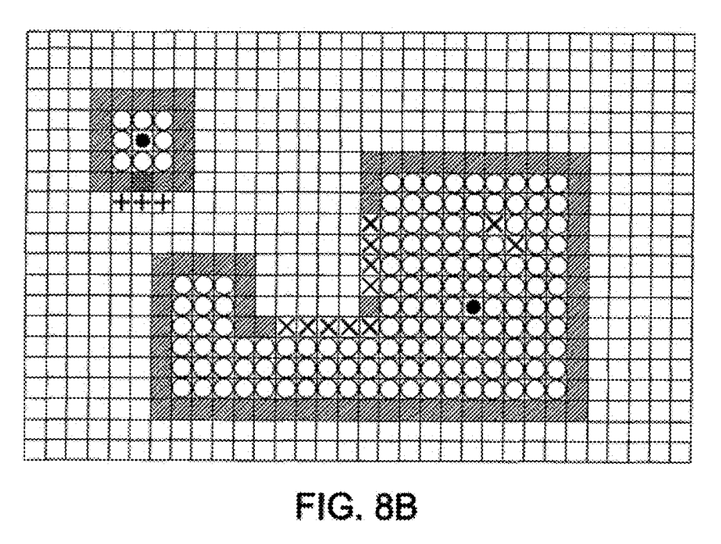

The method described above with reference to FIGS. 1 to 7 in a number of variants is one way of estimating elastic parameters on a well or at a horizontal position not necessarily collocated with a well. A position of this type can constitute a starting position for an ensuing process of propagation of the 4D inversion. For this, use is made of a network of horizontal positions, for example a square network as illustrated by FIGS. 8A-B, forming a surface mesh of the studied area of the subsoil. A typical distance between adjacent positions of such a network is of the order of 5 to 200 meters.

It is considered that a base seismic trace and a monitor seismic trace have been measured in the two successive surveys for each horizontal position of the meshed network, this network being typically constructed as a function of the positions of the sources and receivers during the measurements. For the search for just the parameters $\rho$ and $V_P$, the traces considered have a zero offset. A non-zero offset occurs in the case where the parameter $V_S$ is also sought, as discussed previously with reference to FIG. 7.

Figure 9:
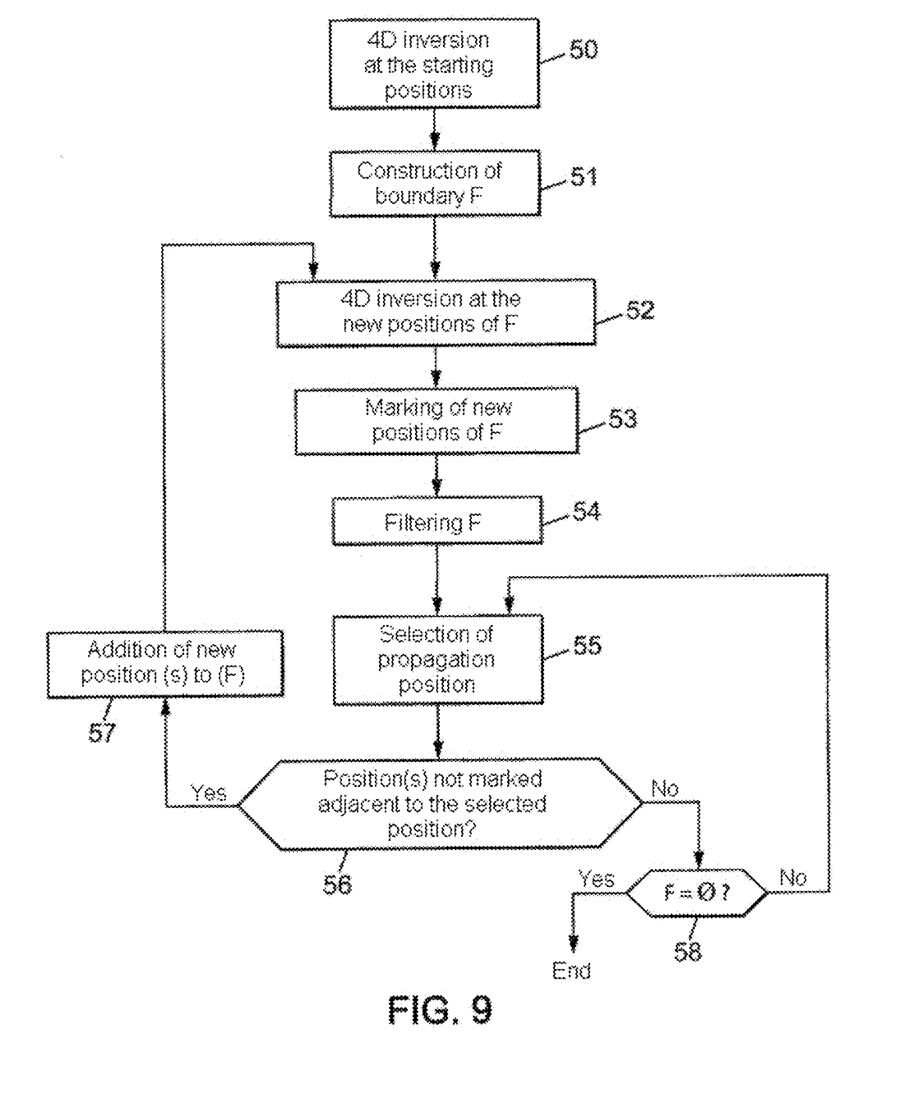
FIG. 9 is a flow diagram of this method, showing the processing steps executed by a computer programmed for its implementation.

FIG. 8A shows, by way of example, two starting positions where wells have been drilled, which are identified by black spots on the drawing. These starting positions constitute seeds for the propagation algorithm. At each of these two starting positions of the network, an estimation of the variations of elastic parameters $\rho$, $V_P$ (and/or $V_S$) in the underlying permeable layers between the base time and the monitor time is obtained in the step 50 of FIG. 9, for example according to one of the methods described with reference to FIGS. 4 to 6. It will be observed that the propagation can also start from a single seed or from more than two seeds.

In the next step 51, the positions of the network which are adjacent to a starting position are taken into account to form a set of positions F, hereinafter called "boundary". The boundary F corresponds to the positions shown shaded in FIG. 8A.

Then, at each position of this boundary, the variations of the elastic parameters in the permeable layers are estimated in the 4D inversion step 52. The estimation can also relate to the depths and/or thicknesses of the permeable layers at the horizontal positions considered. It involves minimization of a cost function derived from the seismic wave propagation model accounting for the evolution between the base and monitor seismic traces associated with the considered position of the boundary. This cost function is preferably computed in the manner described previously with reference to FIG. 6 for an assumption of variation $\Delta\rho$, $\Delta V_P$ to which can be added changes of positions of the interfaces between layers, i.e. spatial variations of depth and/or thickness. It is then given by the sum of the squares or the sum of the absolute values of the difference between the measured monitor seismic trace $A_M(t)$ at the current position of the boundary and a seismic pseudo-trace $A''_M(t)$ determined using the impedance variations according to (4) or (5) in the different layers.

The minimization performed in the step 52 at a position of the boundary F considers assumptions of variation of the parameters which are a function of the variations estimated at the starting position adjacent to this position of F. Only restricted variation ranges around the values resulting from the minimization applied in the step 50 to the adjacent starting position, and restricted changes of depth and of thickness of the permeable layers relative to the depth and thickness values taken into account or determined at the adjacent starting position are explored. This presupposes a relative continuity in the values of the parameters when moving laterally. In other words, it is considered that the rocky layers form geological bodies (geobodies) that are relatively uniform, significantly extensive and of fairly regular form.

In the step 53, each position of the boundary F which has been processed in the preceding step 52 is marked for the seismic inversion not to be repeated there subsequently. The marked positions are those which are not blank in FIGS. 8A and 8B.

Then, in the filtering step 54, the method checks whether there are one or more positions in the boundary F where the cost function minimized in the step 52 exceeds a predefined limit value. If such a position is detected, it is removed from F for the rest of the processing operations. The limit value is preferably chosen as a function of the value that the cost function had at the starting position adjacent to the position considered in F (for example three times this value), or as a function of the smallest value that the function had at the different starting positions, as appropriate. The positions which have been removed from the boundary during a filtering step are identified by the symbol "x" in the example of FIG. 8B.

The method then comprises an iterative process of propagation of the boundary to estimate, step by step, the parameters at the different positions of the network.

In this iterative process, the step 55 consists in selecting, from the positions of the boundary F, a propagation position for which the cost function minimized in the step 52 has the smallest value. In the example of FIG. 8B, the propagation position selected is that represented by the cross-hatching. This position is a priori the most reliable to continue the propagation of the 4D inversion process. In the step 55, the selected position is also removed from the boundary F. The positions removed in this way after having been selected for the propagation are identified by a circle "O" in FIG. 8B.

After the step 55, a test 56 is performed to determine whether the network still contains one or more positions not marked adjacent to the propagation position which has just been selected. If one or more positions of this type still remain, they are added to the boundary F in the step 57 (positions identified by the symbol "+" in FIG. 8B).

After the step 57, the iterative process returns to the step 52 to carry out the 4D inversion at the "+" positions which have just been added to the boundary F. Then, the steps 53-56 described previously are once again carried out in sequence, by marking only the positions newly added to F and by submitting only these new positions to the filtering 54.

When the test 56 reveals no non-marked position of the network adjacent to the propagation position selected in the preceding step 55, another test 58 is carried out to determine whether there are still positions in the boundary F (positions shaded in FIG. 8B). If F is not empty, the process returns to the step 55 to select another propagation position on the boundary F. If there are no more positions in the boundary (F=Ø), the propagation process is terminated.

The propagation algorithm described above makes it possible to evaluate, step by step, the elastic parameters and/or the geometry of the layers. The propagation is performed in such a way as to retain the best possible results for the inversion with limited perturbations of the model. The propagation stops when the assumption of relative continuity of the values of the parameters is no longer in agreement with the measurements.

It will be understood that the invention is not limited to the particular embodiments which have been described above, numerous variants being able to be conceived without departing from the scope defined by the attached claims.

For example, it is possible to constrain the algorithm, during the 4D inversion, to observe predefined layers such as, for example, layers whose positions are given by a reservoir grid. This constraint may be hard (the geometry of the grid is fixed and only variations of the elastic parameters $\rho$, $\Delta V_P$ and/or $\Delta V_S$ are tested in the step 52) or soft (a perturbation of the geometry of the grid by acting on the thicknesses and/or depths of the layers is allowed). In the latter case, the geometry of the reservoir grid is adjusted according to depths and/or thicknesses of layers estimated in the step 52.

The invention claimed is:

1. A method for estimating elastic parameters of a region of the subsoil meshed according to an array of horizontal positions, the method comprising:
   (a) obtaining seismic traces associated with said horizontal positions;
   (b) obtaining an estimation of variations of elastic parameters in layers of the subsoil in at least one starting position of the array;
   (c) determining a boundary consisting of the positions of the array which are adjacent to a starting position;
   (d) obtaining, at each position of the boundary, estimations of variations of the elastic parameters in the layers by minimizing a cost function derived from a seismic wave propagation model accounting for the seismic traces associated with said position of the boundary, the minimization taking into account the estimations obtained at a starting position adjacent to said position of the boundary, and marking each position of the boundary as having been processed;
   (e) selecting at least one propagation position in the boundary, where the minimized cost function has, within the boundary, a minimal value, then removing the selected propagation position from the boundary;
   (f) adding to the boundary each position of the network not marked as processed and adjacent to a propagation position selected in the preceding step (e);
   (g) obtaining, at each position added to the boundary in the preceding step (f), estimations of variations of the elastic parameters in the layers by minimizing the cost function derived from the seismic wave propagation model accounting for the seismic traces associated with said position added to the boundary, the minimization taking into account the estimations obtained at the selected propagation position, and marking each position added to the boundary in the preceding step (f) as having been processed;
   (h) repeating from step (e).

2. The method as claimed in claim 1, wherein the seismic traces obtained in step (a) include seismic traces measured by sending seismic waves at normal incidence toward layers of the subsoil and by collecting the seismic waves reflected by interfaces between said layers.

3. The method as claimed in claim 2, wherein the elastic parameters include a density and a speed of propagation of pressure waves in at least some of said layers.

4. The method as claimed in claim 1, wherein the seismic traces obtained in step (a) include seismic traces measured by sending seismic waves at non-normal incidence toward layers of the subsoil and by collecting the seismic waves reflected by the interfaces between said layers.

5. The method as claimed in claim 4, wherein the elastic parameters include a speed of propagation of shear waves in at least some of said layers along said direction.

6. The method as claimed in claim 1, wherein at least one starting position of the array is given by the position of a well drilled in the subsoil.

7. The method as claimed in claim 1, wherein each of steps (d) and (g) is followed by a step of removing from the boundary any position where the minimized cost function exceeds a limit value.

8. The method as claimed in claim 1, wherein the repeating step (h) is performed if the boundary contains at least one position adjacent to a position of the array not marked as processed.

9. The method as claimed in claim 1, wherein step (a) of obtaining seismic traces associated with the horizontal positions comprises:
   measuring, in a first phase, base seismic traces associated with said horizontal positions; and
   measuring, in a second phase, monitor seismic traces associated with said horizontal positions and corresponding to the base seismic traces, wherein the estimations of variations of elastic parameters obtained in steps (b), (d) and (g) comprise estimations of variations of the elastic parameters between the first and the second phases in layers of the subsoil, and wherein said propagation model accounts for an evolution between the base and monitor seismic traces associated with a position of the boundary.

10. The method as claimed in claim 9, wherein the elastic parameters having variations estimated in steps (d) and (g) are elastic parameters in permeable layers of the subsoil.

11. The method as claimed in claim 10, wherein steps (d) and (g) further comprise obtaining estimations of variations of depths of said permeable layers.

12. The method as claimed in claim 11, wherein the permeable layers are located on the basis of a reservoir grid, and wherein the geometry of the reservoir grid is adjusted according to depths of layers estimated in step (d) or (g).

13. The method as claimed in claim 10, wherein steps (d) and (g) further comprise obtaining estimations of variations of thicknesses of said permeable layers.

14. The method as claimed in claim 13, wherein the permeable layers are located on the basis of a reservoir grid, and wherein the geometry of the reservoir grid is adjusted according to thicknesses of layers estimated in step (d) or (g).

15. The method as claimed in claim 9, wherein a number of assumptions as to the variation of the elastic parameters in permeable layers of the subsoil are defined at a position of the boundary based on the variations estimated at the starting or propagation position adjacent to said position of the boundary, and wherein the minimization of the cost function in step (d) or (g) of estimation, at said position of the boundary, of the variations of the elastic parameters in the permeable layers comprises:

for each of said assumptions:
estimating a perturbation in amplitude of the measured base seismic trace associated with said position of the boundary following the variation of the elastic parameters conforming to said assumption;
computing a seismic pseudo-trace by combining one of the measured seismic traces associated with the position of the boundary with the estimated amplitude perturbation; and
comparing, on a same timescale, the other measured seismic trace associated with the position of the boundary with the computed seismic pseudo-trace in order to evaluate the cost function;
estimating the variation of the elastic parameters in said permeable layers in accordance with an assumption for which the evaluated cost function is minimal.

16. The method as claimed in claim 15, wherein the perturbation in amplitude is estimated as a function of impedance variations in said permeable layers, deduced from the assumption of variation of the elastic parameters, and from a wavelet representative of an incident seismic signal.

17. The method as claimed in claim 15, wherein the measured seismic trace combined with the estimated amplitude perturbation for the computation of the seismic pseudo-trace is the measured monitor seismic trace, the combination comprising:

modifying a timescale of the measured monitor seismic trace to take into account the variation in speed of propagation of the seismic waves according to the assumption of variation of elastic parameters; and
subtracting the estimated amplitude perturbation from the modified measured monitor seismic trace.

18. The method as claimed in claim 15, wherein the assumptions defined at a position of the boundary based on the variations estimated at the starting or propagation position adjacent to said position of the boundary further comprise assumptions as to the variation of depths of said permeable layers, and wherein the minimization of the cost function in step (d) or (g) further comprises, for each assumption, estimating a variation of the depths of said permeable layers in accordance with the assumption for which the evaluated cost function is minimal.

19. The method as claimed in claim 15, wherein the assumptions defined at a position of the boundary based on the variations estimated at the starting or propagation position adjacent to said position of the boundary further comprise assumptions as to the variation of thicknesses of said permeable layers, and wherein the minimization of the cost function in step (d) or (g) further comprises, for each assumption, estimating a variation of the thicknesses of said permeable layers in accordance with the assumption for which the evaluated cost function is minimal.

20. The method as claimed in claim 9, wherein at least one starting position of the array is given by the position of a well drilled in the subsoil, and wherein step (b) of obtaining an estimation of the variations of elastic parameters between the first and the second phases in permeable layers of the subsoil at a starting position given by the position of a well comprises:

making assumptions as to the variation of the elastic parameters in permeable layers of predefined positions along the well between the first and the second phases;
numerically evaluating a capacity of each assumption as to the variation of elastic parameters to account for an evolution between the measured base and monitor seismic traces associated with said starting position;
estimating the variation of the elastic parameters in accordance with an assumption having an optimum evaluated capacity.

21. The method as claimed in claim 20, wherein the numerical evaluation of the capacity of an assumption as to the variation of elastic parameters to account for the evolution between the measured base and monitor seismic traces associated with the starting position comprises:

computing a simulated base seismic trace on the basis of a wavelet representative of an incident seismic signal and of values of the elastic parameters measured in the well in the first phase;
obtaining values of the elastic parameters in the well for the second phase on the basis of the values measured in the well in the first phase and of said assumption of variation;
computing a simulated monitor seismic trace on the basis of said wavelet and of the values of the elastic parameters in the well obtained for the second phase; and
comparing the difference between the measured base and monitor seismic traces associated with the starting position with the difference between the simulated measured base and monitor seismic traces.

22. The method as claimed in claim 20, wherein the numerical evaluation of the capacity of an assumption as to the variation of elastic parameters to account for the evolution between the measured base and monitor seismic traces associated with the starting position comprises:

obtaining values of the elastic parameters in the well for the second phase on the basis of values of the elastic parameters measured in the well in the first phase and of said assumption of variation;
estimating a perturbation in amplitude of said measured base seismic trace resulting from a change of the elastic parameters in the well from the values measured in the first phase to the values obtained for the second phase;

computing a seismic pseudo-trace by combining one of the measured seismic traces associated with the starting position with the estimated amplitude perturbation; and comparing, on a same timescale, the other measured seismic trace associated with the starting position with the computed seismic pseudo-trace.

23. The method as claimed in claim 22, wherein the estimation of the amplitude perturbation comprises:

computing a simulated base seismic trace on the basis of a wavelet representative of an incident seismic signal and of the values of the elastic parameters measured in the well in the first phase;

computing a simulated monitor seismic trace on the basis of said wavelet and of the values of the elastic parameters in the well obtained for the second phase, the simulated base and monitor seismic traces being computed with a same depth-time conversion law; and subtracting the simulated base seismic trace from the simulated monitor seismic trace to obtain the estimated amplitude perturbation.

24. The method as claimed in claim 9, wherein the layers of the subsoil where estimations of variations of the elastic parameters between the first and the second phases are obtained comprise permeable layers located on the basis of a reservoir grid.

* * * * *